US010069316B2

(12) United States Patent
Lin (10) Patent No.: US 10,069,316 B2
(45) Date of Patent: Sep. 4, 2018

(54) USB CHARGING DEVICE INCLUDING SLOTS WITH THREE CONDUCTIVE COMPONENTS (71) Applicant: Chia-Hua Lin, New Taipei (TW)

(72) Inventor: Chia-Hua Lin, New Taipei (TW)

( * ) Notice: Subject to any disclaimer, the term of this patent is extended or adjusted under 35 U.S.C. 154(b) by 154 days.

(21) Appl. No.: 15/288,316

(22) Filed: Oct. 7, 2016

(65) Prior Publication Data
US 2018/0102657 A1 Apr. 12, 2018

(51) Int. Cl.
*H01M 10/46* (2006.01)
*H02J 7/00* (2006.01)
*H01R 24/22* (2011.01)
*H01R 24/30* (2011.01)
*H01R 24/62* (2011.01)
H01R 103/00 (2006.01)
H01R 107/00 (2006.01)
A63H 33/04 (2006.01)
H01R 13/447 (2006.01)
H01R 25/00 (2006.01)
H01R 31/02 (2006.01)
H01R 31/06 (2006.01)

(52) U.S. Cl.
CPC ............ *H02J 7/0044* (2013.01); *H01R 24/22* (2013.01); *H01R 24/30* (2013.01); *H01R 24/62* (2013.01); *H02J 7/0029* (2013.01); *H02J 7/0083* (2013.01); *A63H 33/04* (2013.01); *H01R 13/447* (2013.01); *H01R 25/003* (2013.01); *H01R 31/02* (2013.01); *H01R 31/065* (2013.01); *H01R 2103/00* (2013.01); *H01R 2107/00* (2013.01); *H02J 2007/0039* (2013.01)

(58) Field of Classification Search
CPC ... H02J 2007/0062; H02J 7/355; H02J 7/0042
USPC ......... 320/107, 111, 114, 116; 361/660, 728, 361/733, 763, 784, 785
See application file for complete search history.

(56) References Cited

U.S. PATENT DOCUMENTS

| 2013/0300368 A1* | 11/2013 | Navid | H01R 31/06 320/115 |
| 2014/0077759 A1* | 3/2014 | Liao | H02J 7/0042 320/108 |
| 2015/0130402 A1* | 5/2015 | O'Neill | H02J 7/041 320/107 |
| 2015/0263550 A1* | 9/2015 | Han | H02J 7/0042 320/108 |

(Continued)

*Primary Examiner* — Edward Tso
(74) *Attorney, Agent, or Firm* — WPAT, PC (57) ABSTRACT A USB charging device is disclosed, comprising a charging base and multiple USB chargers, in which the surface of the charging base is installed with several positioning slots and the bottom of the positioning slot has DC power output holes. In addition, the bottom of the USB charger is configured with a fixation bump fitting into the shape of the fixation slot, and conductive pillars extend from the fixation bump, while the other end of the USB charger includes a USB port for electrically connecting to a USB charging line. Herein the conductive pillars of the USB charger can be inserted into any one of the positioning DC output holes on the surface of the charging base such that DC power can be transferred to the USB port and thus further transferred to the electronic device via the USB charging line for power recharging.

10 Claims, 8 Drawing Sheets

(56) References Cited

U.S. PATENT DOCUMENTS

2015/0380961 A1* 12/2015 Tseng .................... H02J 7/0042
                                                          320/107
2016/0202743 A1*  7/2016 Li ............................ G06F 1/26
                                                          710/313
2016/0268825 A1*  9/2016 Byrne ................... H02J 7/0044
2016/0370835 A1* 12/2016 Erickson ................ G06F 1/266

* cited by examiner

USB CHARGING DEVICE INCLUDING SLOTS WITH THREE CONDUCTIVE COMPONENTS

BACKGROUND OF THE INVENTION

1. Field of the Invention

The present invention generally relates to a USB charging device; in particular, it relates to a USB charging device enabling free selections of the most appropriate fixation slot for inserting a USB charger in position based on the placement and location of an electronic device thereby facilitating the best use of space.

2. Description of Related Art

Rechargeable electronic devices have been comprehensively applied and all of such, e.g., smartphones, tablet computers, Bluetooth speakers or other portable electronic devices etc, need electricity to operate, so in case the electric power in electronic devices is about to run out or already depleted, electric power charging is definitely required for continued use. Hence, the rechargeable electronic devices are all conjunctively provided with a charging line and a charging seat.

A conventional charging seat usually comprises a USB charging line and a transformer having a USB port, in which the transformer includes an alternative current (AC) power plug and a USB port, and this USB port is used for electrically insertion connecting to the USB plug of the USB charging line, while the other end of the USB connection line is electrically connected to the electronic device. By directly inserting the AC power plug onto an AC power socket so as to guide AC power into the transformer which then transforming AC power into direct current (DC) power, it is possible to charge the electronic device via the USB charging line. However, although such conventional chargers can successfully charge the electronic device, since modern people may be in possession of many electronic devices at the same time, charging multiple electronic devise simultaneously may become problematic due to limitations caused by the number of wall power sockets or extension line sockets as well as their locations. Moreover, even if it is possible to charge multiple electronic devices at the same time, seeing that the charging locations are fixed, to well arrange the placements of these electronic devices remains an issue to be resolved.

Therefore, it would be an optimal solution if it is possible to provide a device capable of simultaneously charging multiple electronic devices, well arranging and aligning the placements of such electronic devices within limited space, and also offering free selection of the suitable charging port for power charging in considering the sizes of the charging products and charging space.

SUMMARY OF THE INVENTION

A USB charging device comprises: a charging base which includes a case, and a plurality of fixation slots are configured on the top surface of the case, the bottom of the fixation slot is configured with a first plug-in hole, a second plug-in hole and a third plug-in hole, a charging circuit board is placed within the case and connected to the power line of an alternative current (AC) power source plug such that the charging circuit board can receive alternative current and convert the received AC power into direct current (DC) power so as to output to a first conductive component, a second conductive component and a third conductive component, wherein each of the first conductive component, the second conductive component and the third conductive component has a positioning hole respectively corresponding to the first plug-in hole, the second plug-in hole and the third plug-in, and the first conductive component and the third conductive component are connected to a first electrode of the DC power outputted by the charging circuit board, while the second conductive component connected to a second electrode of the DC power; a USB charger, in which a surface of the USB charger is configured with a USB port and the other surface thereof configured with a fixation bump, and a first conductive pillar, a second conductive pillar and a third conductive pillar extend from the fixation bump, a USB circuit board is placed within the USB charger and includes a first electrode and a second electrode having DC power, wherein the first conductive pillar and the third conductive pillar are connected to the first electrode of the USB circuit board, while the second conductive pillar connected to the second electrode of the USB circuit board, also the first electrode and second electrode are both electrically connected to the USB port such that the DC power received by the USB charger can be transferred to the USB port for output; additionally, the first electrode and the second electrode for outputting DC power from the USB charger and the charging base have the same polarity, so that the DC powers outputted by the first conductive pillar and the third conductive pillar as well as the first conductive component and the third conductive component are of the same electrode, while the DC powers outputted by the second conductive pillar and the second conductive component are of the same electrode; wherein the first conductive pillar, the second conductive pillar and the third conductive pillar of the USB charger are respectively inserted into the first plug-in hole, the second plug-in hole and the third plug-in hole of the charging base, and at the same time also inserted into the positioning holes of the first conductive component, the second conductive component and the third conductive component, such that the first conductive pillar, the second conductive pillar and the third conductive pillar are electrically connected to the first conductive component, the second conductive component and the third conductive component respectively thereby outputting DC power to the USB port of the USB connector; moreover, the fixation bump of the USB can be inserted into the fixation slot tightly fitted to the charging base thus firmly fixing the USB charger onto the charging base.

In a preferred embodiment, the charging circuit board mainly comprises an over-current protection circuit, a rectification filter circuit, an electro-magnetic interference (EMI) protection filter circuit, a procrastinated activation control circuit, an over-voltage detection circuit, a pulse width modulation (PWM) control power source circuit, a pulse width modulation (PWM) control circuit, a metal-oxide-semiconductor field effect transistor (MOSFET) circuit, an output current detection circuit, a transformer and an output rectification filter circuit; also, wherein the over-current protection circuit is applied to receive AC power and protect the AC power output and line failures; the rectification filter circuit is electrically connected to the over-current protection circuit and transforms the received AC power into DC power; the EMI protection filter circuit receives signals from the rectification filter which can be a low-pass filter, thereby restricting high frequency noises and stabilizing the received DC power, and then transfers to the transformer and the procrastinated activation control circuit; the procrastinated activation control circuit receives the signals from the EMI protection filter circuit and then provides the EMI control circuit with the procrastinated activation function thereby preventing unstable voltage output in case the input DC power has not been completely stabilized yet; the transformer receives the EMI protection filter circuit signals and then transfers such signals to the PWM control power source circuit, the over-voltage detection circuit and the MOSFET circuit, and the over-voltage detection circuit receives the signals sent by the transformer and then controls the output voltage value of the output voltage so as to prevent the output voltage from becoming excessively high and transfers the processed signals to the PWM control circuit; meanwhile, the PWM control power source circuit receives the signals from the transformer and then provides the PWM control circuit with DC voltage needed for operations in the PWM control circuit; in addition, the PWM control circuit receives the signals coming from the procrastinated activation control circuit, the over-voltage detection circuit, the PWM control power source circuit and the output current detection circuit in order to transfer controlled stable output voltage and current into the MOSFET circuit; afterwards, the MOSFET circuit receives the signals from the transformer thus controlling the output switch action time of the transformer, and is electrically connected to the output current detection circuit such that the output current detection circuit can perform detections on the output current and output over-current and then send the detection results to the PWM control circuit; when the MOSFET circuit drives the transformer to output DC power, the signal of the DC power can be transferred to the output rectification filter circuit so that the output rectification filter circuit can rectify the pulse waveform signals from the transformer into the DC power output; additionally, the outputted DC power includes a first electrode and a second electrode.

In a preferred embodiment, the first electrode is a positive electrode (Vcc) and the second electrode is a negative electrode (GND).

In a preferred embodiment, the first electrode is a negative electrode (GND) and the second electrode is a positive electrode (Vcc).

In a preferred embodiment, the first electrode of the DC power outputted by the charging circuit board and the USB charging board is the negative electrode (GND) and the second electrode thereof is the positive electrode (Vcc).

In a preferred embodiment, the first electrode of the DC power outputted by the charging circuit board and the USB charging board is the positive electrode (Vcc) and the second electrode thereof is the negative electrode (GND).

In a preferred embodiment, one side of the case of the charging base is configured with at least one or more AC power sockets which can be electrically connected to the power lines of the AC power plug such that the AC power sockets can provide electronic devices with AC power for applications.

In a preferred embodiment, multiple USB chargers may be simultaneously plugged onto the charging base with each of such USB chargers being able to fit into USB ports of different specifications.

In a preferred embodiment, one or more compartment seats are further included, wherein the bottom of the compartment seat is installed with a fixation bump which can be inserted into the fixation slot of the charging base such that the compartment seat can be fixedly inserted onto the fixation slot of the charging base in order to operate as an abutment compartment for an electronic device and to prevent exterior dusts thereby refraining alien objects or dusts from entering into the fixation slot.

In a preferred embodiment, the wall surface of the charging base where the fixation hole is not installed is alternatively configured with building block bumps for building block assemblage, and the fixation slot of the charging base can be combined with a building block as well so that, by way of such a combination with the building block, a specifically profiled compartment wall or exterior wall can be thus formed in order to allow stable abutments and placements of electronic devices.

DETAILED DESCRIPTION OF THE PREFERRED EMBODIMENTS

Other technical contents, aspects and effects concerning the present invention can be clearly appreciated through the detailed descriptions on the preferred embodiments of the present invention in conjunction with the appended drawings.

Figure 1:
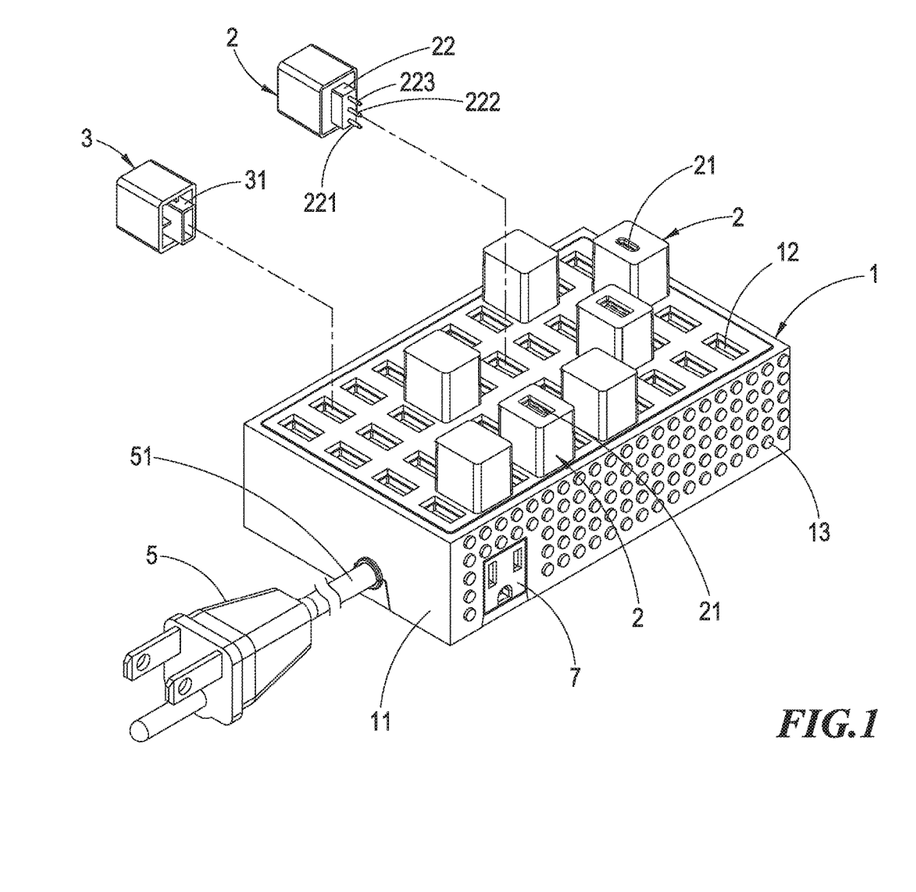
FIG. 1 shows a stereo view of an innovative USB charging device according to the present invention.
Figure 2:
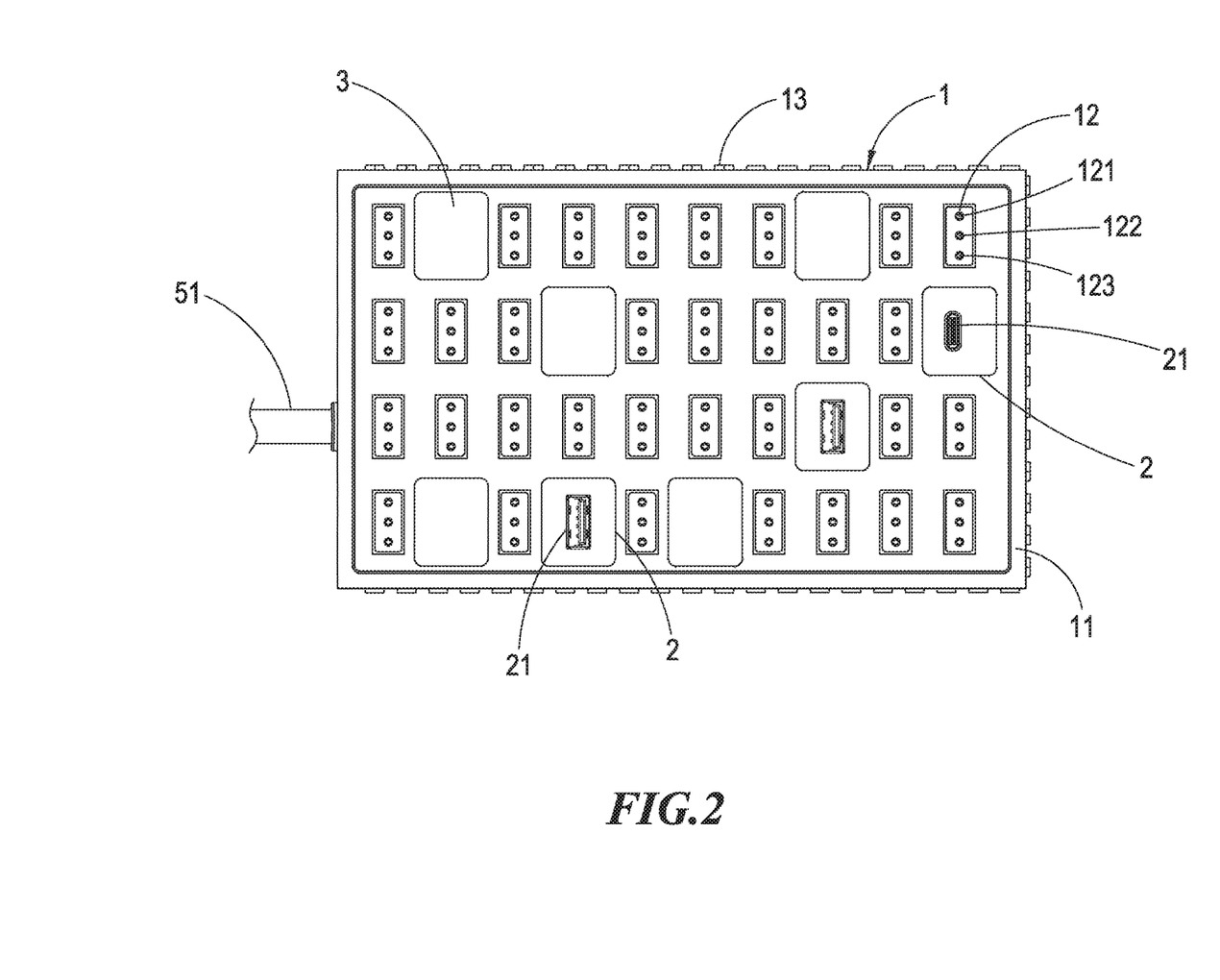
FIG. 2 shows a top view of the innovative USB charging device according to the present invention.
Figure 3:
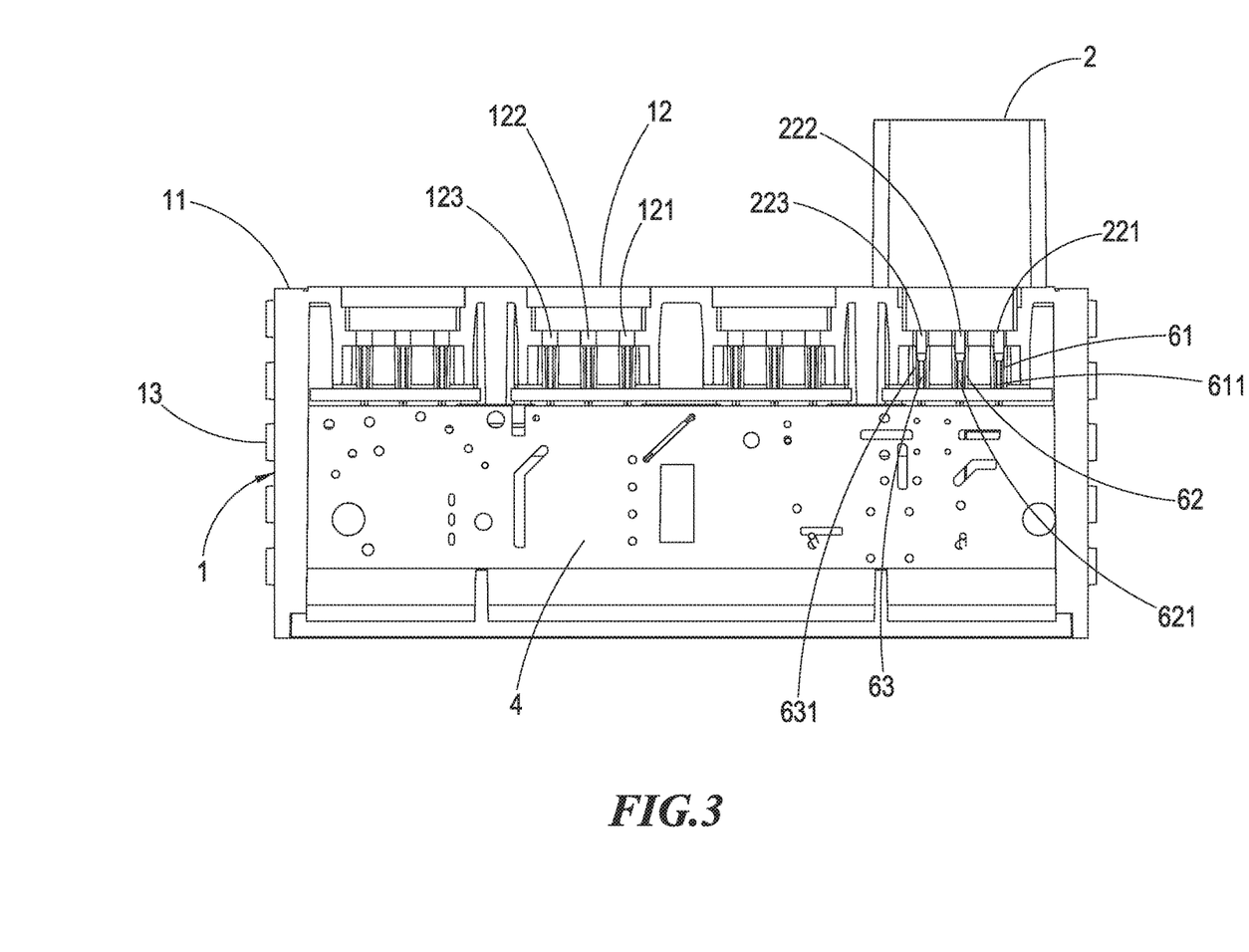
FIG. 3 shows a cross-section view of the innovative USB charging device according to the present invention.

Refer first to FIGS. 1~3, wherein a stereo view, a top view and a cross-section view of the innovative USB charging device according to the present invention are respectively shown. It can be seen that the illustrated device essentially comprises a charging base 1, at least one or more USB chargers 2 as well as at least one or more compartment seats 3; herein the charging base 1 includes a case 11, the top surface of the case 11 is set up with a plurality of fixation slots 12, and also the bottom of the fixation slot 12 is configured with a first plug-in hole 121, a second plug-in hole 122 and a third plug-in hole 123 (see FIG. 2), in which the second plug-in hole 122 is located between the first plug-in hole 121 and the third plug-in hole 123, and DC powers outputted by the first plug-in hole 121 and the third plug-in hole 123 are of the same electrode (possibly of the positive electrode or the negative electrode output.) Additionally, such a plurality of the fixation slots 12 may be of an array arrangement or else any irregular formations, all of such are by no means restricted in the present invention.

Figure 4:
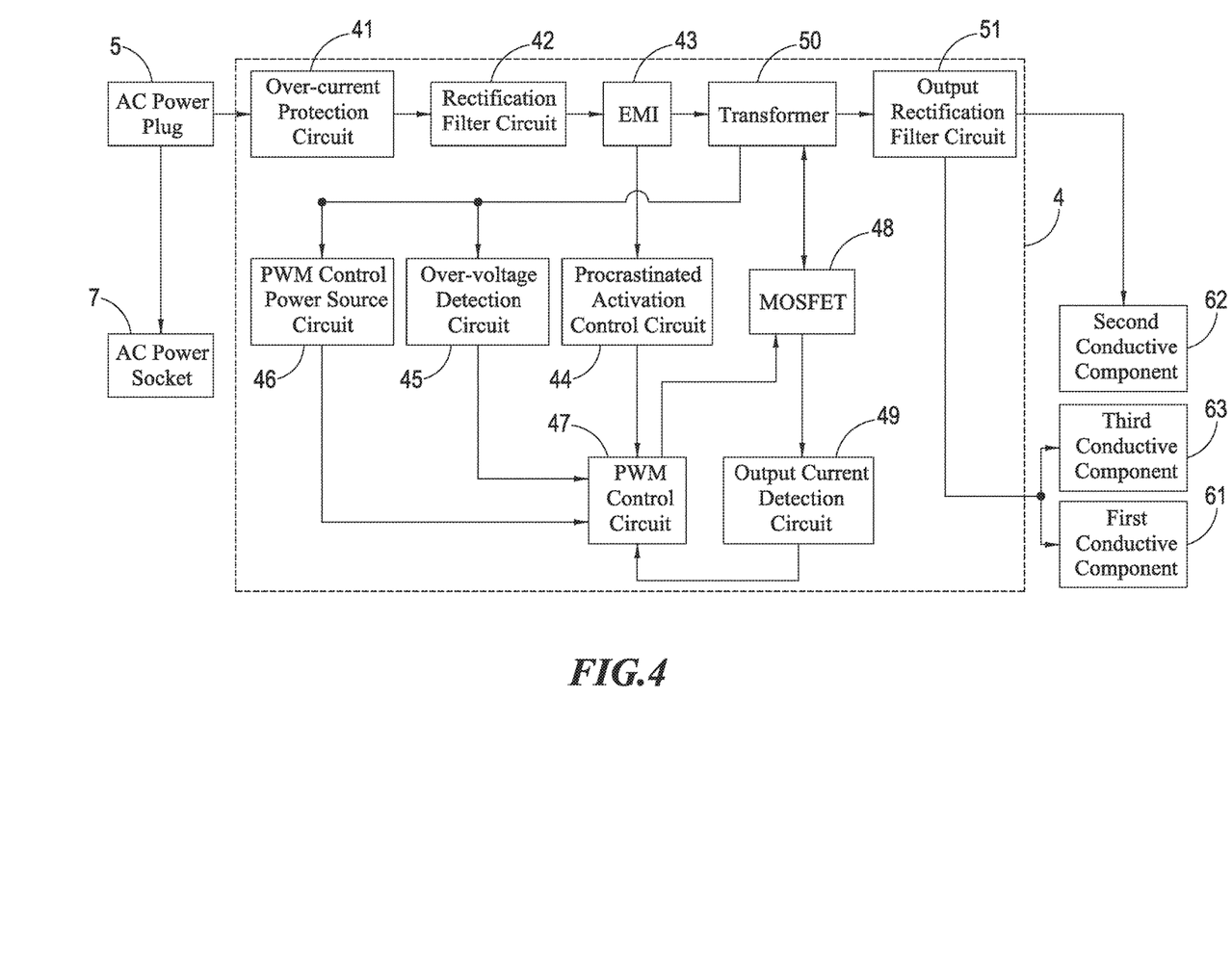
FIG. 4 shows a block diagram of the charging circuit board in the innovative USB charging device according to the present invention.
Figure 5:
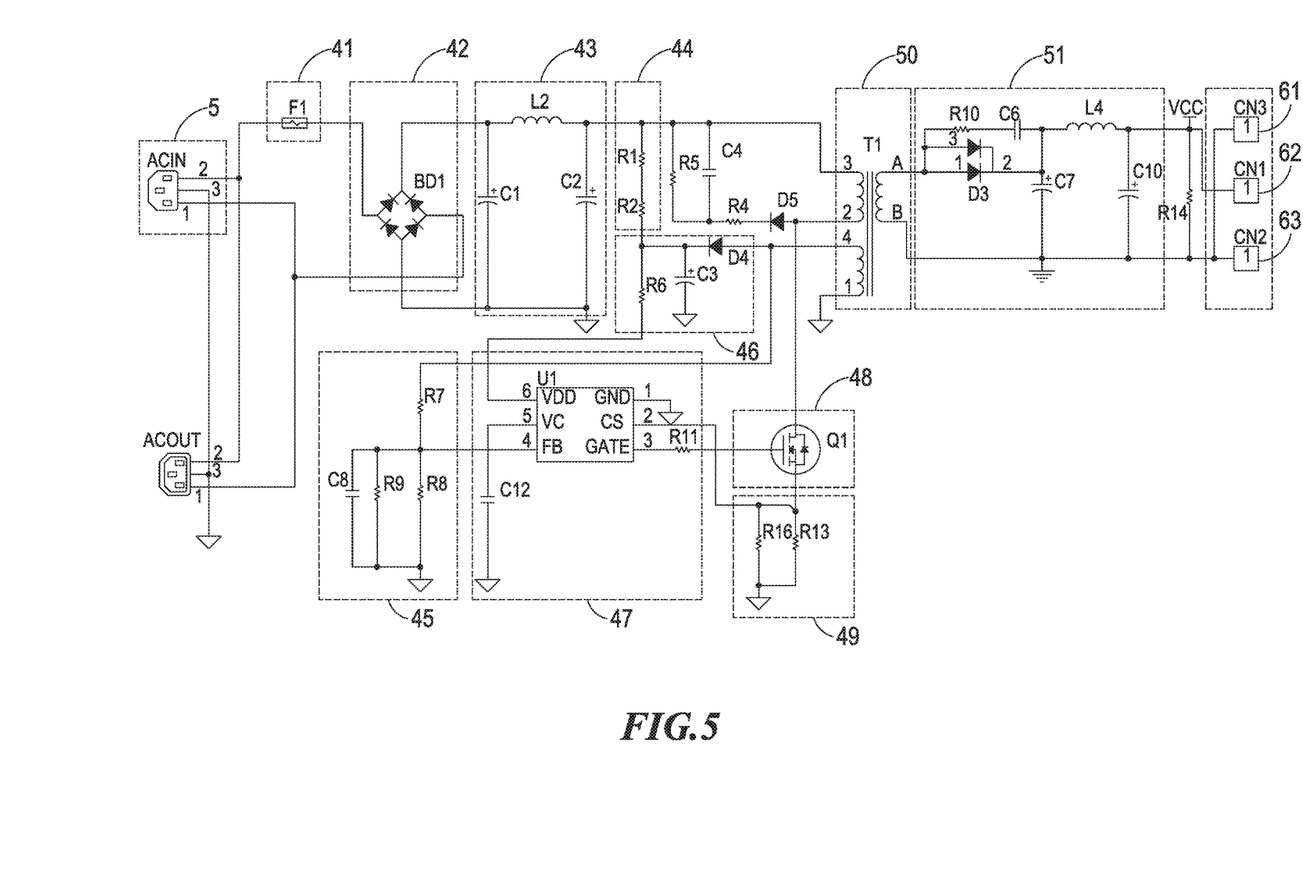
FIG. 5 shows a circuit diagram of the charging circuit board in the innovative USB charging device according to the present invention.

The case 11 is internally installed with a charging circuit board 4 (see FIG. 3) which is connected to the power line 51 of an AC power plug 5 (as shown in FIGS. 4 and 5) for receiving AC power from the AC power plug 5; meanwhile, the charging circuit board 4 essentially includes an over-current protection circuit 41, a rectification filter circuit 42, an electro-magnetic interference (EMI) protection filter circuit 43, a procrastinated activation control circuit 44, an over-voltage detection circuit 45, a pulse width modulation (PWM) control power source circuit 46, a pulse width modulation (PWM) control circuit 47, a metal-oxide-semiconductor field effect transistor (MOSFET) circuit 48, an output current detection circuit 4, a transformer 50 and an output rectification filter circuit 51. Herein the over-current protection circuit 41 is applied to receive AC power signals from the AC power plug 5 and protect the AC power output and line failures. The rectification filter circuit 42 is electrically connected to the over-current protection circuit 41 and transforms the received AC power into DC power output. The EMI protection filter circuit 43 is electrically connected to the rectification filter circuit 42, which can be a low-pass filter thereby impeding high frequency noises and stabilizing the received DC power and then transferring to the transformer 50 and the procrastinated activation control circuit 44. Besides, the procrastinated activation control circuit 44 receives the signals from the EMI protection filter circuit 43 and then provides the EMI control circuit 47 with the procrastinated activation function thereby preventing unstable voltage output in case the input DC power has not been completely stabilized. Next, the transformer 50 receives the EMI protection filter circuit 43 signals and then transfers such signals to the PWM control power source circuit 46, the over-voltage detection circuit 45 and the MOSFET circuit 48, and then the over-voltage detection circuit 45 receives the signals sent by the transformer 50 and accordingly controls the output voltage value of the output voltage so as to prevent the output voltage from becoming excessively high and transfers the processed signals to the PWM control circuit 47. Moreover, the PWM control power source circuit 46 receives the signals from the transformer 50 and then provides the PWM control circuit 47 with DC voltage needed for operations in the PWM control circuit 47; the PWM control circuit 47 receives the signals coming from the procrastinated activation control circuit 44, the over-voltage detection circuit 45, the PWM control power source circuit 46 and the output current detection circuit 49 in order to transfer controlled stable output voltage and current into the MOSFET circuit 48; afterwards, the MOSFET circuit 48 receives the signals from the transformer 50 thus controlling the output switch action time of the transformer 50, and is electrically connected to the output current detection circuit 49 such that the output current detection circuit 49 can perform detections on the output current and output over-current and then send the detection results to the PWM control circuit 47; when the MOSFET circuit 48 drives the transformer 50 to output DC power, the signal of the DC power can be transferred to the output rectification filter circuit 51 so that the output rectification filter circuit 51 can rectify the pulse waveform signals from the transformer 50 into the DC power output. Additionally, the outputted DC power includes a first electrode and a second electrode. in which the first electrode is a positive electrode (Vcc) and the second electrode is a negative electrode (GND). Or, on the contrary, in case the first electrode is a negative electrode (GND), the second electrode is a positive electrode (Vcc).

The DC power outputted by the charging circuit board 4 via the rectification filter circuit 51 can be outputted to a first conductive component 61, a second conductive component 62 and a third conductive component 63; herein on the first conductive component 61, second conductive component 62 and third conductive component 63 there configure the positioning holes 611, 621 and 631 respectively corresponding to the first plug-in hole 121, second plug-in hole 122 and third plug-in hole 123. In the present embodiment, the first conductive component 61 and the third conductive component 63 are connected to the positive electrode (Vcc) of the charging circuit board 4, while the second conductive component 62 connected to the negative electrode (GND) thereof (as shown in FIG. 5).

Besides, one side of the case 11 is configured with at least one or more AC power sockets 7 which can be electrically connected to the power lines 51 of the AC power plug 5 (see FIGS. 1 and 4) such that the AC power sockets 7 can provide an electronic device with required AC power for applications.

Figure 6:
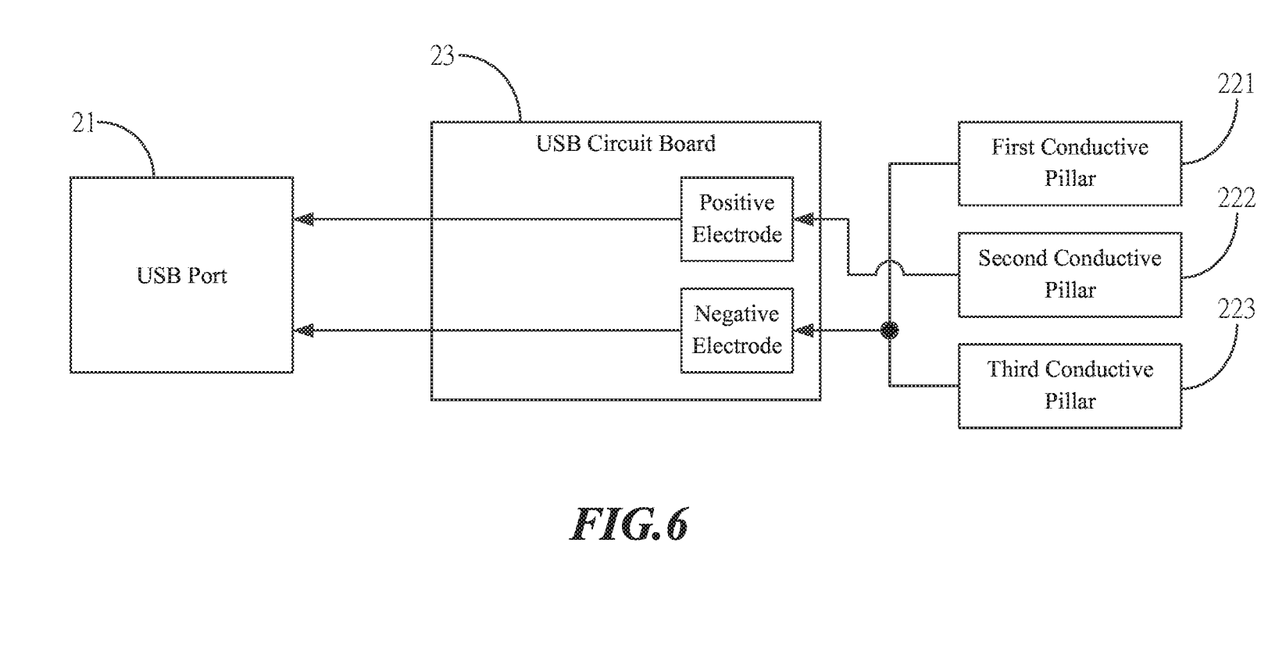
FIG. 6 shows a block diagram of the USB circuit board in the innovative USB charging device according to the present invention.

One surface of the USB charger 2 is installed with a USB port 21 while the other surface thereof is set up with a fixation bump 22 from which a first conductive pillar 221, a second conductive pillar 222 and a third conductive pillar 223 extend; besides, the USB charger 2 is internally installed with a USB circuit board 23 (as shown in FIG. 6) which includes a positive electrode (Vcc) and a negative electrode (GND) of the DC power. Herein, in the present embodiment, the first conductive pillar 221 and the third conductive pillar 223 are connected to the negative electrode (GND) of the USB circuit board 23, while the second conductive pillar 222 connected to the positive electrode (Vcc) of the USB circuit board 23. Moreover, the positive electrode and the negative electrode of the USB circuit board 23 can be electrically connected to the USB port 21 such that the DC power received by the USB charger 2 can be transferred to the USB port 21 for output.

Furthermore, the first conductive pillar 221, the second conductive pillar 222 and the third conductive pillar 223 of the USB charger 2 are respectively inserted into the first plug-in hole 121, the second plug-in hole 122 and the third plug-in hole 123 of the charging base 1, and at the same time also inserted into the positioning holes 611, 621 and 631 of the first conductive component 61, the second conductive component 62 and the third conductive component 63, such that the first conductive pillar 221, the second conductive pillar 222 and the third conductive pillar 223 are electrically connected to the first conductive component 61, the second conductive component 62 and the third conductive component 63 respectively thereby outputting DC power to the USB port 21 of the USB connector 2; in addition, the fixation bump 22 of the USB charger 2 can be inserted into the fixation slot 12 tightly fitted to the charging base 1 thus firmly fixing the USB charger 2 onto the charging base 1.

Also, multiple USB chargers 2 may be simultaneously plugged onto the charging base 1 with each of such USB chargers 2 being able to fit into USB ports 21 of different specifications (See FIG. 1).

Additionally, the bottom of the compartment seat 3 is installed with a fixation bump 31 which can be inserted into the fixation slot 12 of the charging base 1 such that the compartment seat 3 can be fixed onto the charging base 1 in order to operate as an abutment compartment for an electronic device and to avoid exterior dusts thereby preventing alien objects or dusts from entering into the fixation slot 12.

Figure 7:
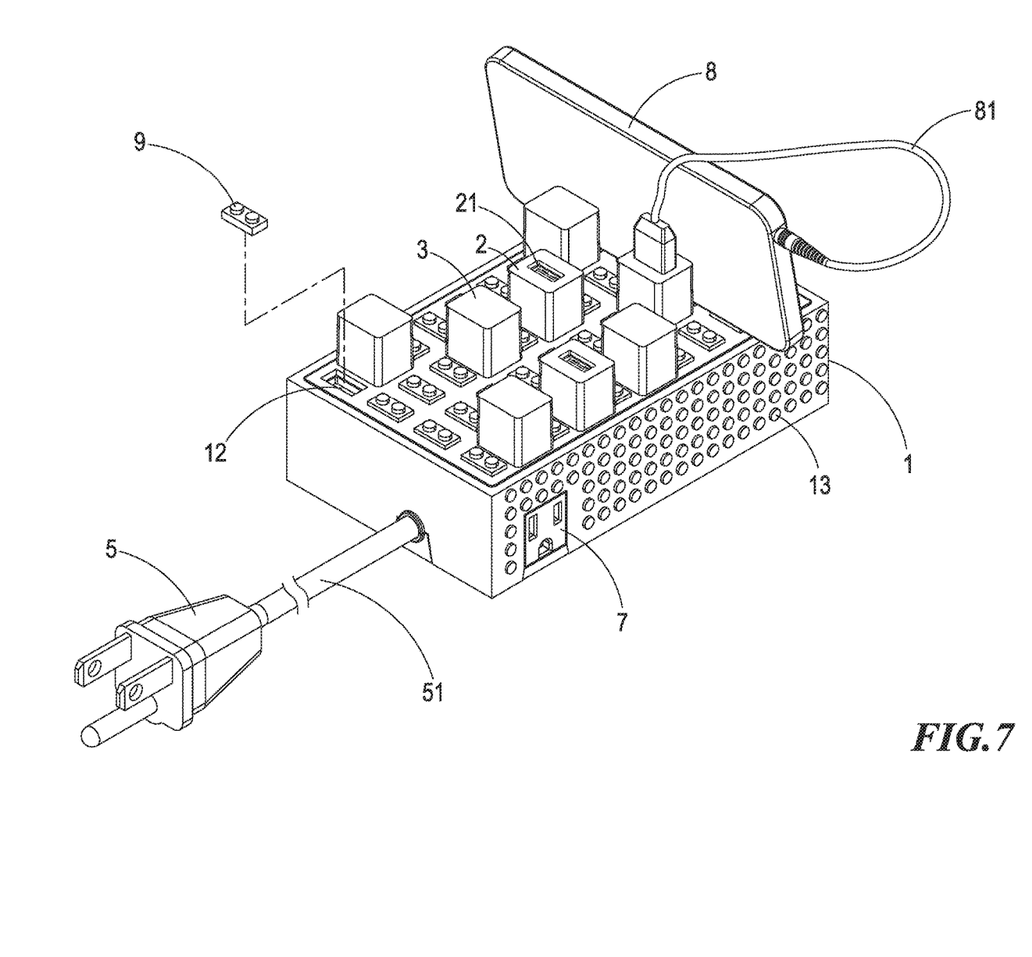
FIG. 7 shows a view for a first embodiment of the innovative USB charging device according to the present invention.

Refer next to FIG. 7, wherein a first embodiment according to the present invention is shown. Herein, depending on the size of an electronic device 8 and the length of the USB charging line 81, it is possible to plug the USB charger 2 into a suitable fixation slot 12 on the charging base 1 and place the compartment seat 3 to an appropriate location so that the electronic device 8 can firmly abut against it for positioning; or, alternatively, multiple compartment blocks 3 may be utilized such that the electronic device 8 can be well placed in alignment for charging thus resolving the issues caused by overly small or large size of the electronic device so as to facilitate the applicability with regards to electronic devices 8 of different sizes.

Moreover, the first conductive pillar 221 and third conductive pillar 223 of the USB charger 2 as well as the first conductive component 61 and the third conductive component 63 are of the same electrode, therefore, upon inserting the first conductive pillar 221, second conductive pillar 222 and third conductive pillar 223 of the USB charger 2 respectively into the position holes 611, 621 and 631 of the first conductive component 61, second conductive component 62 and third conductive component 63 by way of the first plug-in hole 121, second plug-in hole 122 and third plug-in hole 123 of the charging base 1, it offers the benefits of arbitrary orientations and unplugging at will, indicating no need to concern about the erroneous connection issues for DC electrodes, thereby enabling convenient operations for users.

Figure 8:
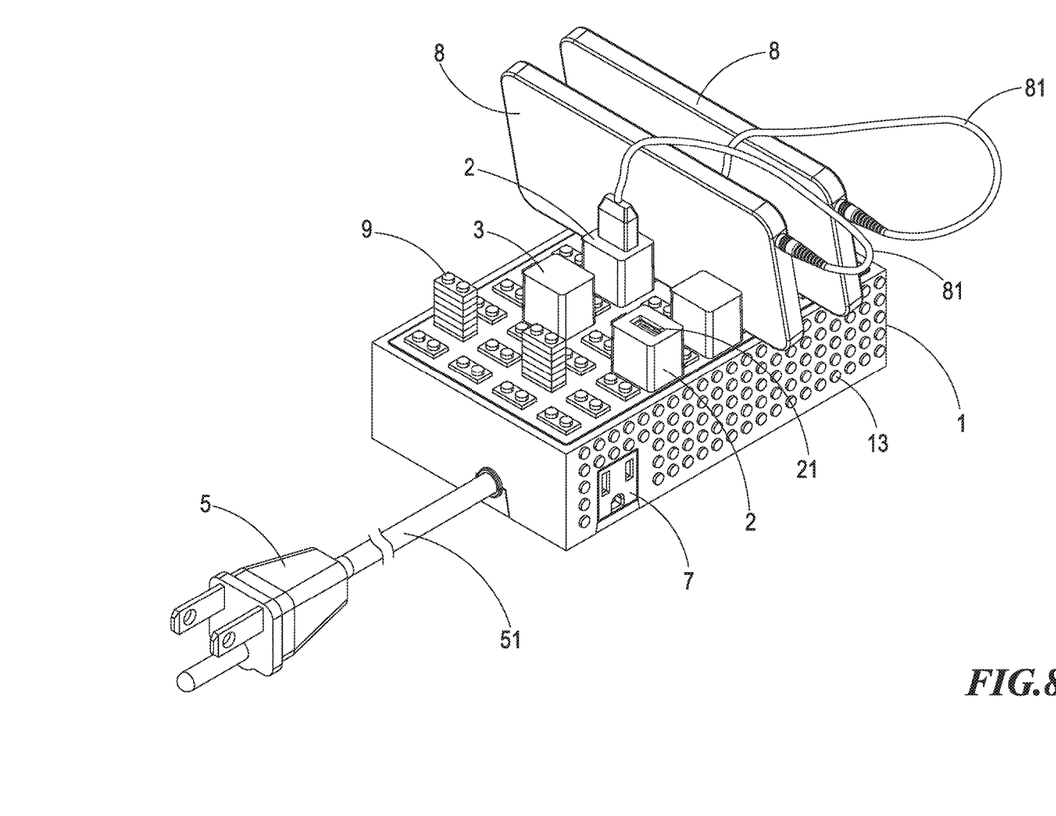
FIG. 8 shows a view for a second embodiment of the innovative USB charging device according to the present invention.

Refer next to FIG. 8, wherein a second embodiment according to the present invention is shown. Herein, again, depending on the sizes of the electronic devices 8 and the lengths of their USB charging lines 81, it is possible to arrange the USB charger 2 and the compartment seat 3 to appropriate locations so that the space can be effectively utilized, two or more charging devices 8 can be set up onto the charging base 1 with each of such electronic devices 8 being well aligned and placed on the charging base 1 in accordance with their individual sizes.

As shown in FIGS. 7 and 8, on the wall surface of the charging base 1 without the setup of the fixation slots 12 there can be installed with building block bumps 13 so the user can assemble building blocks thereon during the spare time of charging. In addition, a building block 9 can also cover the fixation slot 12 so as to prevent dusts and further allow the assembly of building blocks 9 by the user thus forming a specifically devised compartment wall or external wall in order to stabilize the abutment and placement of the electronic devices 8 and increase integral profiling effects as well.

Furthermore, the first conductive pillar 221 and third conductive pillar 223 of the aforementioned USB charger 2 as well as the first conductive component 61 and third conductive component 63 in the charging base 1 may be also connected to the positive electrode (Vcc) of the DC power, while the second conductive pillar 222 and the second conductive component 62 connected to the negative electrode (GND), which can similarly achieve the objective of orientation-free plugging/unplugging operations of the USB charger 2 on the fixation slot as well.

What is claimed is:

1. A USB charging device, comprising:
a charging base which includes a case, and a plurality of fixation slots are configured on a top surface of the case, a bottom of the fixation slot is configured with a first plug-in hole, a second plug-in hole and a third plug-in hole, a charging circuit board is placed within the case and connected to a power line of an alternative current (AC) power source plug such that the charging circuit board receives alternative current and convert the received AC power into direct current (DC) power so as to output to a first conductive component, a second conductive component and a third conductive component, wherein each of the first conductive component, the second conductive component and the third conductive component has a positioning hole respectively corresponding to the first plug-in hole, the second plug-in hole and the third plug-in, and the first conductive component and the third conductive component are connected to a first electrode of the DC power outputted by the charging circuit board, while the second conductive component connected to a second electrode of the DC power;
a USB charger, in which a surface of the USB charger is configured with a USB port and the other surface thereof configured with a fixation bump, and a first conductive pillar, a second conductive pillar and a third conductive pillar extend from the fixation bump, a USB circuit board is placed within the USB charger and includes a first electrode and a second electrode having DC power, wherein the first conductive pillar and the third conductive pillar are connected to the first electrode of the USB circuit board, while the second conductive pillar connected to the second electrode of the USB circuit board, also the first electrode and second electrode are both electrically connected to the USB port such that the DC power received by the USB charger is transferred to the USB port for output; additionally, the first electrode and the second electrode for outputting DC power from the USB charger and the charging base have the same polarity, so that the DC powers outputted by the first conductive pillar and the third conductive pillar as well as the first conductive component and the third conductive component are of the same electrode, while the DC powers outputted by the second conductive pillar and the second conductive component are of the same electrode;
wherein the first conductive pillar, the second conductive pillar and the third conductive pillar of the USB charger are respectively inserted into the first plug-in hole, the second plug-in hole and the third plug-in hole of the charging base, and at the same time also inserted into the positioning holes of the first conductive component, the second conductive component and the third conductive component, such that the first conductive pillar, the second conductive pillar and the third conductive pillar are electrically connected to the first conductive component, the second conductive component and the third conductive component respectively thereby outputting DC power to the USB port of the USB connector; moreover, the fixation bump of the USB is inserted into the fixation slot tightly fitted to the charging base thus firmly fixing the USB charger onto the charging base.

2. The USB charging device according to claim 1, wherein the charging circuit board mainly comprises an over-current protection circuit, a rectification filter circuit, an electro-magnetic interference (EMI) protection filter circuit, a procrastinated activation control circuit, an over-voltage detection circuit, a pulse width modulation (PWM) control power source circuit, a pulse width modulation (PWM) control circuit, a metal-oxide-semiconductor field effect transistor (MOSFET) circuit, an output current detection circuit, a transformer and an output rectification filter circuit; also, wherein the over-current protection circuit is applied to receive AC power and protect the AC power output and line failures; the rectification filter circuit is electrically connected to the over-current protection circuit and transforms the received AC power into DC power; the EMI protection filter circuit receives signals from the rectification filter which is a low-pass filter, thereby restricting high frequency noises and stabilizing the received DC power, and then transfers to the transformer and the procrastinated activation control circuit; the procrastinated activation control circuit receives the signals from the EMI protection filter circuit and then provides the EMI control circuit with the procrastinated activation function thereby preventing unstable voltage output in case the input DC power has not been completely stabilized yet; the transformer receives the EMI protection filter circuit signals and then transfers such signals to the PWM control power source circuit, the over-voltage detection circuit and the MOSFET circuit, and the over-voltage detection circuit receives the signals sent by the transformer and then controls the output voltage value of the output voltage so as to prevent the output voltage from becoming excessively high and transfers the processed signals to the PWM control circuit; meanwhile, the PWM control power source circuit receives the signals from the transformer and then provides the PWM control circuit with DC voltage needed for operations in the PWM control circuit; in addition, the PWM control circuit receives the signals coming from the procrastinated activation control circuit, the over-voltage detection circuit, the PWM control power source circuit and the output current detection circuit in order to transfer controlled stable output voltage and current into the MOSFET circuit; afterwards, the MOSFET circuit receives the signals from the transformer thus controlling the output switch action time of the transformer, and is electrically connected to the output current detection circuit such that the output current detection circuit performs detections on the output current and output over-current and then send the detection results to the PWM control circuit; when the MOSFET circuit drives the transformer to output DC power, the signal of the DC power is transferred to the output rectification filter circuit so that the output rectification filter circuit rectifies the pulse waveform signals from the transformer into the DC power output; additionally, the outputted DC power includes a first electrode and a second electrode.

3. The USB charging device according to claim 2, wherein the first electrode is a positive electrode (Vcc) and the second electrode is a negative electrode (GND).

4. The USB charging device according to claim 2, wherein the first electrode is a negative electrode (GND) and the second electrode is a positive electrode (Vcc).

5. The USB charging device according to claim 1, wherein the first electrode of the DC power outputted by the charging circuit board and the USB charging board is the negative electrode (GND) and the second electrode thereof is the positive electrode (Vcc).

6. The USB charging device according to claim 1, wherein the first electrode of the DC power outputted by the charging circuit board and the USB charging board is the positive electrode (Vcc) and the second electrode thereof is the negative electrode (GND).

7. The USB charging device according to claim 1, wherein one side of the case of the charging base is configured with at least one or more AC power sockets which is electrically connected to the power lines of the AC power plug such that the AC power sockets provide electronic devices with AC power for applications.

8. The USB charging device according to claim 1, wherein multiple USB chargers may be simultaneously plugged onto the charging base with each of such USB chargers fits into USB ports of different specifications.

9. The USB charging device according to claim 1, further comprising one or more compartment seats, wherein the bottom of the compartment seat is installed with a fixation bump which is inserted into the fixation slot of the charging base such that the compartment seat is fixed onto the fixation slot of the charging base in order to operate as an abutment compartment for an electronic device and to avoid exterior dusts thereby preventing alien objects or dusts from entering into the fixation slot.

10. The USB charging device according to claim 1, wherein a wall surface of the charging base where the fixation hole is not installed is alternatively configured with a building block bump for building block assemblage, and the fixation slot of the charging base is combined with a building block as well so that, by way of such a combination with the building block, a specifically profiled compartment wall or exterior wall is formed in order to allow stable abutments and placements of electronic devices.

* * * * *